(12) United States Patent
Park et al.

(10) Patent No.: US 11,901,967 B2
(45) Date of Patent: Feb. 13, 2024

(54) ANALOG FRONT-END RECEIVER AND ELECTRONIC DEVICE INCLUDING THE SAME

(71) Applicant: SAMSUNG ELECTRONICS CO., LTD., Suwon-si (KR)

(72) Inventors: Byeong Gyu Park, Hwaseong-si (KR); Jae Hyun Park, Seoul (KR); Jun Han Bae, Hwaseong-si (KR); Ho-Bin Song, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 294 days.

(21) Appl. No.: 17/380,779

(22) Filed: Jul. 20, 2021

(65) Prior Publication Data
US 2022/0109467 A1    Apr. 7, 2022

(30) Foreign Application Priority Data

Oct. 5, 2020 (KR) .................. 10-2020-0128018

(51) Int. Cl.
*H04B 3/14* (2006.01)
(52) U.S. Cl.
CPC ..................... *H04B 3/14* (2013.01)
(58) Field of Classification Search
CPC ... H04B 3/14; H04B 3/04; H04B 3/06; H04B 3/141; H04B 3/143; H04B 3/145; H04B 3/146; H04B 3/148
USPC ....................................... 333/28 R
See application file for complete search history.

(56) References Cited

U.S. PATENT DOCUMENTS

| | | | |
|---|---|---|---|
| 7,519,130 B2 | 4/2009 | Hsu et al. | |
| 7,720,141 B2 | 5/2010 | Fang et al. | |
| 7,724,815 B1 | 5/2010 | Raha et al. | |
| 7,733,964 B2 | 6/2010 | Hsu et al. | |
| 7,961,817 B2 | 6/2011 | Dong et al. | |
| 9,438,188 B2 | 9/2016 | Li et al. | |
| 9,442,875 B2 | 9/2016 | Chen | |
| 9,467,310 B2 | 10/2016 | Bankman et al. | |
| 9,584,184 B2 | 2/2017 | Li et al. | |
| 9,800,218 B1 | 10/2017 | Rasmus | |
| 9,966,908 B1 | 5/2018 | Carey | |
| 2012/0133459 A1* | 5/2012 | Zhuang | H04B 3/14 333/28 R |
| 2013/0099879 A1* | 4/2013 | Trautman | H04B 3/14 333/28 R |

(Continued)

*Primary Examiner* — Stephen E. Jones
(74) *Attorney, Agent, or Firm* — Sughrue Mion, PLLC

(57) ABSTRACT

Provided is an analog front-end receiver including: a first equalizer including a first block switch configured to receive a first differential signal through a first node, and configured to block the first differential signal in a first operation mode; a second equalizer including a second block switch configured to receive a second differential signal through a second node, and configured to block the second differential signal in the first operation mode; a terminating resistor provided between the first node and the second node, and configured to receive the first differential signal via the first node, and receive the second differential signal via the second node; and a low pass filter configured to receive a third differential signal converted by the terminating resistor from the first differential signal, and configured to receive a fourth differential signal converted by the terminating resistor from the second differential signal.

20 Claims, 13 Drawing Sheets

(56) References Cited

U.S. PATENT DOCUMENTS

2021/0408970 A1* 12/2021 Hong ................. H03F 3/45183

* cited by examiner

ANALOG FRONT-END RECEIVER AND ELECTRONIC DEVICE INCLUDING THE SAME

CROSS-REFERENCE TO THE RELATED APPLICATION

This application is based on and claims priority under 35 U.S.C. § 119 from Korean Patent Application No. 10-2020-0128018, filed on Oct. 5, 2020 in the Korean Intellectual Property Office, the disclosure of which is herein incorporated by reference in its entirety.

BACKGROUND

1. Field

The disclosure relates to an analog front-end receiver and an electronic device including the same.

2. Description of the Related Art

With the development of an electronic industry, high-functional, high-speed, and small electronic components have been increasingly demanded. Even an integrated IP block that supports both a low-speed differential signal and a high-speed differential signal follows the trend of miniaturization.

For example, there is a tendency to employ, as an input transistor of a continuous time linear equalizer (CTLE) that receives an output of an analog front-end receiver, an N-type transistor that is relatively small and has a performance that is less deteriorated even if it is miniaturized, compared to a P-type transistor that is relatively large and has a performance that is deteriorated when it is miniaturized.

Since, however, the N-type transistor requires a relatively higher common mode voltage than the P-type transistor, the IP block that supports the common mode voltage required by the N-type transistor for the low-speed differential signal and the high-speed differential signal is required.

SUMMARY

One or more example embodiments according to aspects of the disclosure provide an analog front-end receiver including a voltage generator that newly defines a common mode voltage.

One or more example embodiments according to aspects of the disclosure also provide an analog front-end receiver in which a path through which a high-speed differential signal passes and a path through which a low-speed differential signal passes are separated and the two paths share a terminating resistor.

However, aspects of the disclosure are not restricted to those set forth herein. The above and other aspects of the disclosure will become more apparent to one of ordinary skill in the art to which the disclosure pertains by referencing the detailed description of the disclosure given below.

According to aspects of some example embodiments of the disclosure, there is provided an analog front-end receiver including: a first equalizer including a first block switch, the first block switch being configured to receive a first differential signal through a first node to which a first data line is electrically connected, and configured to block the first differential signal in a first operation mode; a second equalizer including a second block switch, the second block switch being configured to receive a second differential signal through a second node to which a second data line is electrically connected, and configured to block the second differential signal in the first operation mode, the second differential signal being in a differential relationship with the first differential signal, and the second data line being different from the first data line; a terminating resistor provided between the first node and the second node, the terminating resistor being configured to receive the first differential signal from the first data line via the first node, and configured to receive the second differential signal from the second data line via the second node; and a low pass filter configured to receive a third differential signal converted by the terminating resistor from the first differential signal, and configured to receive a fourth differential signal converted by the terminating resistor from the second differential signal.

According to aspects of some example embodiments of the disclosure, there is provided an analog front-end receiver including: a terminating resistor provided between a first node, to which a first data line is electrically connected, and a second node, to which a second data line is electrically connected, the terminating resistor being configured to receive a first differential signal from the first data line via the first node, and configured to receive a second differential signal from the second data line via the second node, the second differential signal being differential from the first differential signal; a first equalizer configured to, in a first operation mode, block the first differential signal provided through the first node, and configured to, in a second operation mode, output a first equalization differential signal corresponding to the first differential signal to a third node without blocking the first differential signal, the second operation mode being different from the first operation mode; a second equalizer configured to, in the first operation mode, block the second differential signal provided through the second node, and configured to, in the second operation mode, output a second equalization differential signal corresponding to the second differential signal to a fourth node without blocking the second differential signal; and a common mode voltage generator including a first current source electrically connected to the third node and a second current source electrically connected to the fourth node, wherein the first current source is configured to provide a current to the first equalizer to provide a first common mode voltage to the third node, and the second current source is configured to provide a current to the second equalizer to provide a second common mode voltage to the fourth node.

According to aspects of some example embodiments of the disclosure, there is provided an electronic device including: a physical layer configured to receive a first differential signal and a second differential signal that are differential from each other through an external interface, and configured to output digital data corresponding to the first differential signal and the second differential signal; a link layer configured to output a control signal based on the digital data; and a driving device in which a program is executed based on the control signal, wherein the physical layer includes: a first equalizer configured to, in a first operation mode, block the first differential signal provided through a first node, and configured to, in a second operation mode, output a first equalization differential signal corresponding to the first differential signal without blocking the first differential signal, the second operation mode being different from the first operation mode; a second equalizer configured to, in the first operation mode, block the second differential signal provided through a second node, and configured to, in the second operation mode, output a second equalization differential signal corresponding to the second differential signal without blocking the second differential signal; a terminating resistor provided between the first node and the second node, and configured to receive the first differential signal through the first node, and configured to receive the second differential signal through the second node; and a low pass filter configured to receive a third differential signal converted by the terminating resistor from the first differential signal, and to receive a fourth differential signal converted by the terminating resistor from the second differential signal, wherein in the second operation mode, the low pass filter is turned off to block outputs corresponding to the third differential signal and the fourth differential signal.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION

Hereinafter, example embodiments of the disclosure will be described with reference to the accompanying drawings. In the following description made with reference to FIGS. 1 to 13, the same reference numbers are used to refer to substantially the same components, and a redundant description of the corresponding components will be omitted. Like reference numbers refer to like elements throughout the various drawings.

Figure 1:
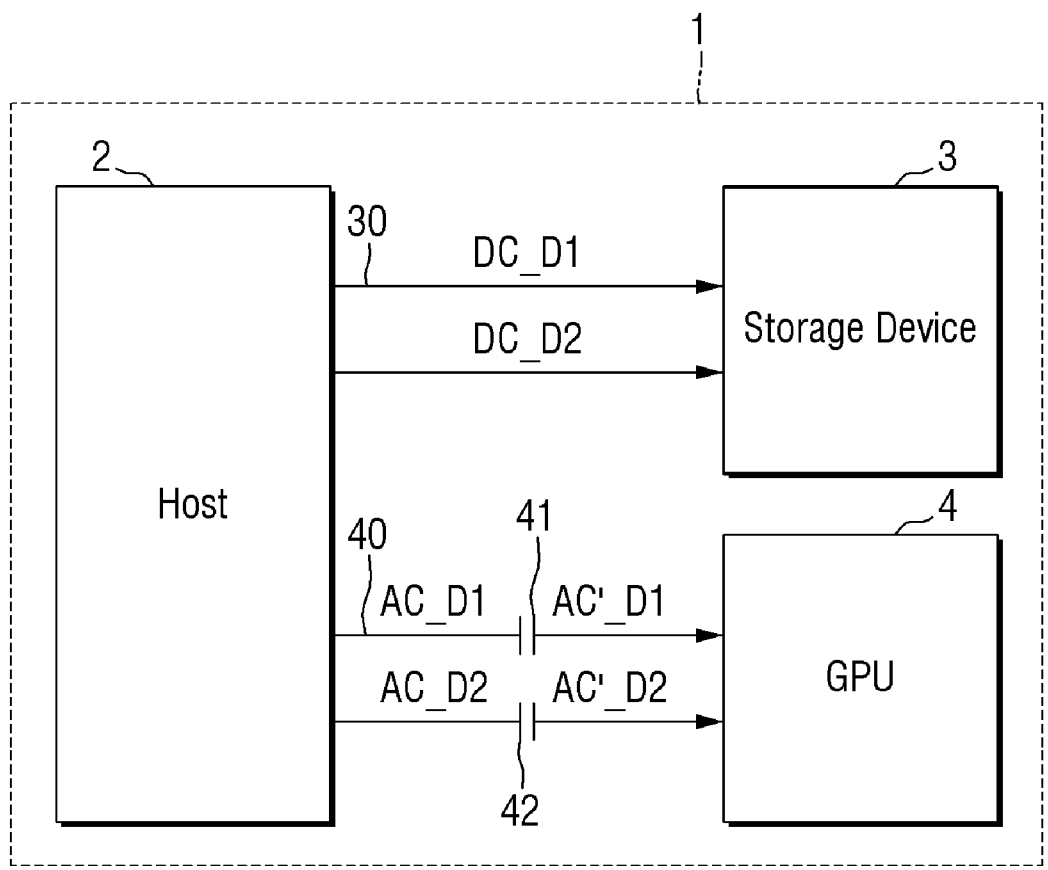
FIG. 1 is a block diagram illustrating an electronic system according to some embodiments of the disclosure.
Figure 2:
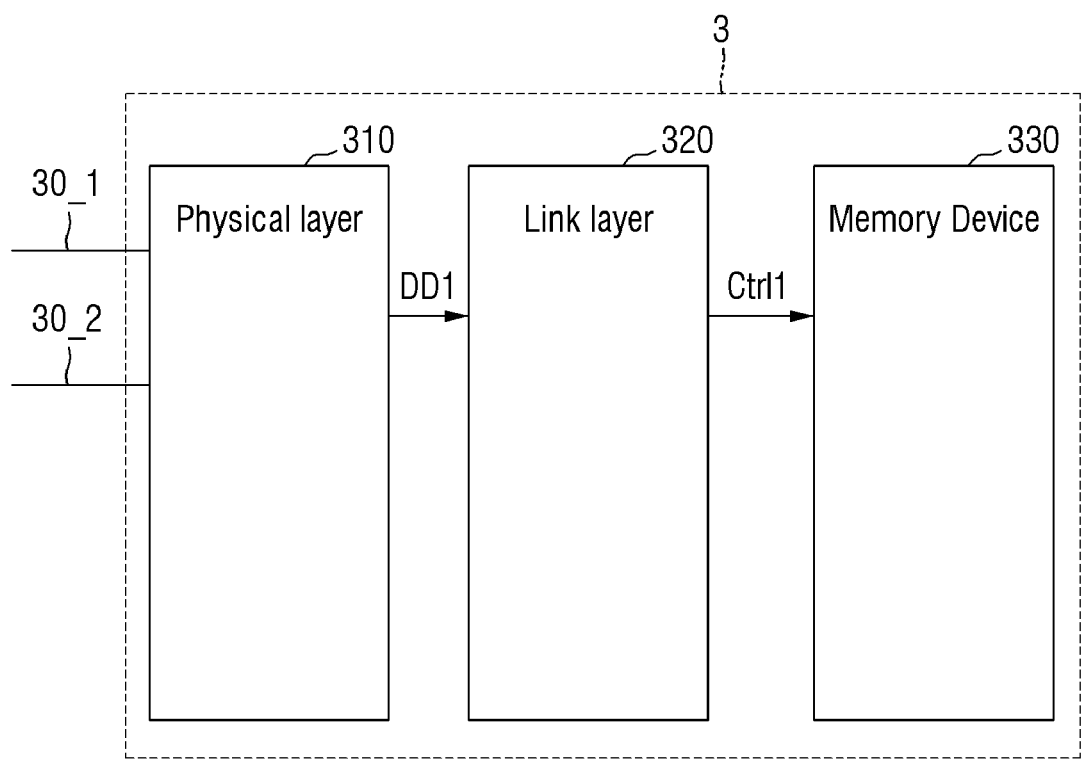
FIG. 2 is a block diagram illustrating a storage device according to some embodiments of the disclosure.
Figure 3:
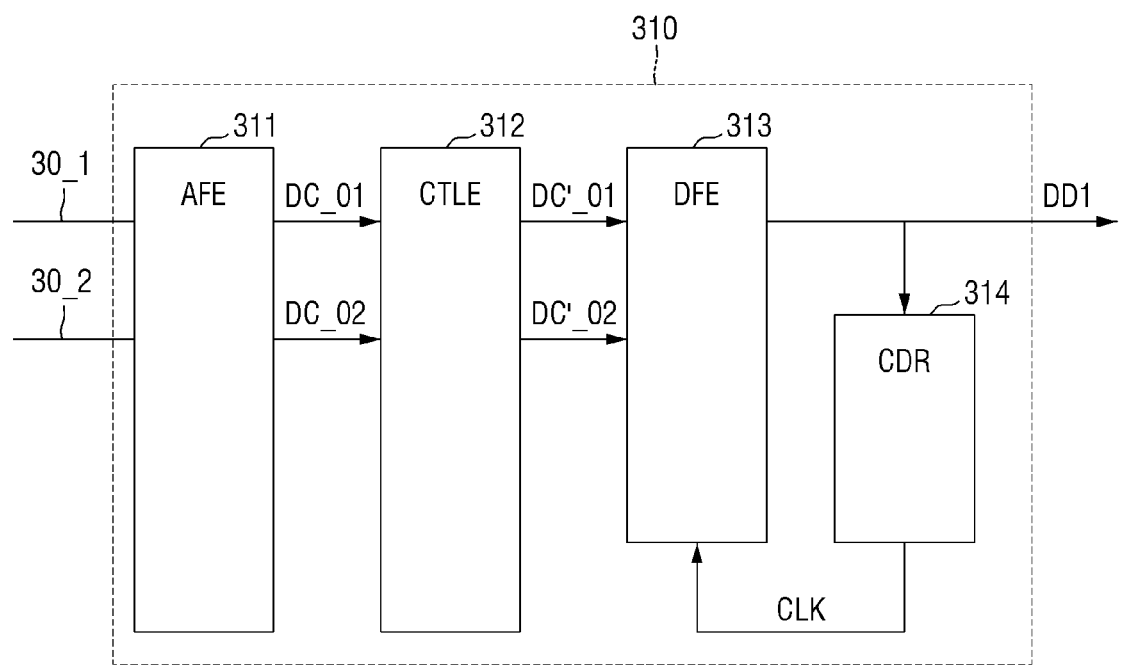
FIG. 3 is a block diagram illustrating a graphics processing unit (GPU) according to some embodiments of the disclosure.
Figure 4:
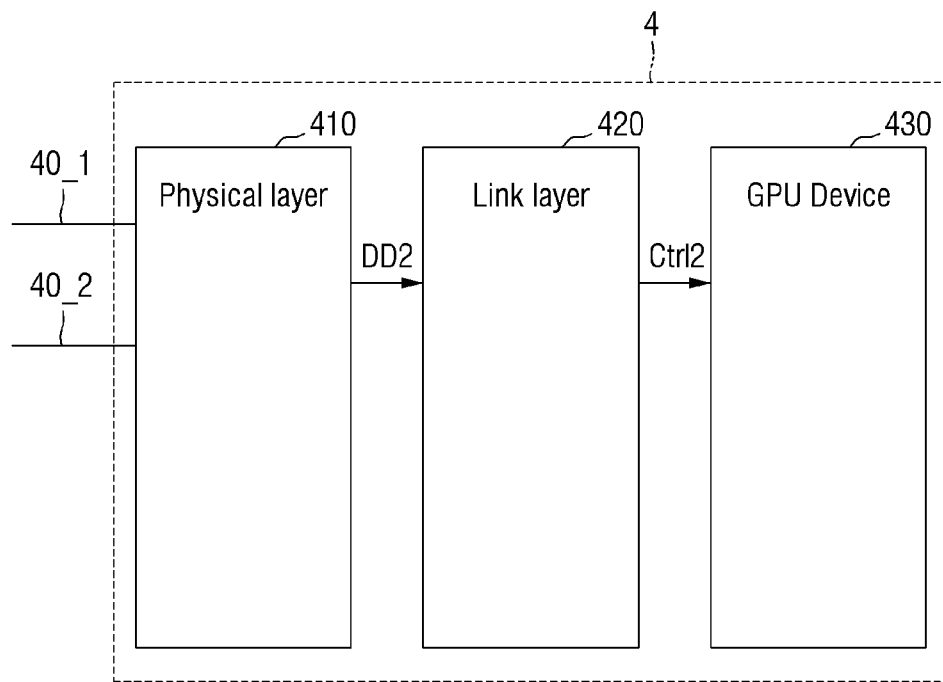
FIG. 4 is a block diagram illustrating a physical layer according to some embodiments of the disclosure.

FIG. 1 is a block diagram illustrating an electronic system 1 according to some embodiments of the disclosure. FIG. 2 is a block diagram illustrating a storage device 3 according to some embodiments of the disclosure. FIG. 3 is a block diagram illustrating a graphics processing unit (GPU) 4 according to some embodiments of the disclosure. FIG. 4 is a block diagram illustrating a physical layer according to some embodiments of the disclosure.

Referring to FIGS. 1 to 4, the electronic system 1 according to some embodiments of the disclosure may include a host 2, the storage device 3, the GPU 4, a low-speed signal channel 30, and a high-speed signal channel 40.

The electronic system 1 may be implemented as a smartphone, a tablet personal computer (table PC), a camera, a personal digital assistant (PDA), a digital recorder, an MP3 player, an internet tablet, a mobile internet device (MID), a wearable computer, or an electronic toy.

The host 2 may control one or more electronic devices 3 and 4. For example, the host 2 may be implemented as a system on chip and may mean a hardware or a circuit implemented in an application processor (IC).

Although a single host 2 is illustrated in FIG. 1, a plurality of hosts may operate. Some circuits or some hardware of the host 2 may operate as separate hosts to the storage device 3 and the GPU 4.

The host 2 may control the operation of the storage device 3 through an internal interface and the low-speed signal channel 30. The internal interface of the host 2 may operate as a universal flash storage (UFS) host or the like in relation to the storage device 3, and may include a link layer (e.g., MIPI UniProSM) and a physical layer (e.g., MIPI M-PHYSM). However, embodiments of the disclosure are not limited to the above examples, and the hose 2 may provide a first low-speed differential signal DC_D1 and a second low-speed differential signal DC_D2 to the storage device 3 through a first low-speed data line 30_1 and a second low-speed data line 30_2 included in the low-speed signal channel 30, respectively. The first and second low-speed differential signals DC_D1 and DC_D2 may include an electrical signal having a frequency of 100 Mhz or less. In an example embodiment, the electrical signal may be a direct current electrical signal DC.

Similarly, the host 2 may control the operation of the GPU 4 through the internal interface and the high-speed signal channel 40. The internal interface of the host 2 may include a link layer (e.g., PCIe Data Link) and a physical layer (e.g., PCIe PHY) in relation to the GPU 4. However, embodiments of the disclosure are not limited to the above examples, and the host 2 may provide a first high-speed differential signal AC_D1 and a second high-speed differential signal AC_D2 to the storage device 3 through first and second high-speed data lines 40_1 and 40_2 included in the high-speed signal channel 40. The first and second high-speed differential signals AC_D1 and AC_D2 may be alternating current electrical signals AC having a frequency higher than 100 Mhz.

The storage device 3 that is an electronic device may be a volatile memory chip such as a dynamic random access memory (DRAM) or a static random access memory (SRAM), or may be a nonvolatile memory chip such as a phase-change random access memory (PRAM), a magnetoresistive random access memory (MRAM), a ferroelectric random access memory (FeRAM), a resistive random access memory (RRAM), a flash memory, or the like. Although it is illustrated in FIG. 1 that the electronic device 3 is the storage device that receives the low-speed differential signals DC_D1 and DC_D2, the electronic device 3 may include a display module (e.g., a display device) or a sensing module (e.g., a sensor) that may receive the low-speed differential signals DC_D1 and DC_D2 through the first and second low-speed data lines 30_1 and 30_2 included in the low-speed signal channel 30. The embodiments of the disclosure are not limited to the above examples and will be described while using the storage device 3 as a representative example for simplicity of description.

The storage device 3 may include a physical layer 310, a link layer 320, and a memory device 330.

The physical layer 310 of the storage device 3 may transmit and receive data between the host 2 and the storage device 3 to transmit and receive an analog electrical signal to and from the external interface. The physical layer 310 may receive the low-speed differential signals DC_D1 and DC_D2 that are analog signals from the host 2 and provide a first digital data DD1 to the link layer 320. On the other hand, the physical layer 310 may receive the first digital data DD1 from the link layer 320 and provide the low-speed differential signals DC_D1 and DC_D2 that are analog signals to the host 2. For example, the physical layer 310 of the storage device 3 may include MIPI M-PHY$^{SM}$, although not limited thereto.

The physical layer 310 may include an analog front-end receiver 311, a continuous time linear equalizer (CTLE) 312, a decision feedback equalizer 313, and a clock-data recovery 314.

A detailed description of the circuit structure of the analog front-end receiver 311 will be provided later. The analog front-end receiver 311 operates in a first operation mode to receive the first and second low-speed differential signals DC_D1 and DC_D2, newly define a common mode voltage for the first and second low-speed differential signals DC_D1 and DC_D2, perform signal amplification, and output a first low-speed differential output signal DC_O1 and a second low-speed differential output signal DC_O2.

The CTLE 312 may receive the first and second low-speed differential output signals DC_O1 and DC_O2 and eliminate/reduce or compensate channel distortion such as ISI or the like. Further, the CTLE 312 may filter noise received from the channel and output a first conversion differential output signal DC'_O1 and a second conversion differential output signal DC'_O2.

An input transistor (not shown) that receives the first and second low-speed differential output signals DC_O1 and DC_O2 in the CTLE 312 may be an N-type transistor. The N-type transistor requires a higher common mode voltage than the P-type transistor. Accordingly, the analog front-end receiver 311 of the disclosure may newly define the common mode voltage.

The decision feedback equalizer 313 may perform sampling based on the first and second conversion differential output signals DC'_O1 and DC'_O2, further eliminate/reduce or compensate the channel distortion or the like of the sampled signal, filter the noise received from the channel, and output the first digital data DD1.

The clock-data recovery 314 may extract a clock signal CLK based on the first digital data DD1, eliminate a phase difference between the first digital data DD1 and the clock signal CLK, and synchronize the rising edge of the first digital data DD1 with the rising edge of the clock signal CLK. The phase difference between the first digital data DD1 and the clock signal CLK may be eliminated by providing the synchronized clock signal CLK to the decision feedback equalizer 313.

The link layer 320 may output a first control signal Ctrl1 according to a communication protocol (rule) based on the first digital data DD1 outputted from the physical layer 310. The link layer 320 of the storage device 3 may include, e.g., MIPI UniPro$^{SM}$ defined by MIPI alliance, although not limited thereto.

A program for the memory device 330 may be executed in response to the first control signal Ctrl1. The memory device 330 of the storage device 3 may perform erasing, reading or writing in response to the first control signal Ctrl1. When the component that receives the first and second differential signals DC_D1 and DC_D2 is not the storage device 3 but a display module or a sensing module, a display operation or a sensing operation may be performed.

The GPU 4 that is an electronic device may be implemented as a calculation device for input data. Although it is illustrated in FIG. 1 that the GPU is the component that receives first and second DC block high-speed differential signals AC'_D1 and AC'_D2, other components such as a central processor unit (CPU), a micro processor unit (MPU), an application specific integrated circuit (ASIC), a modem chip, or the like may receive the first and second DC block high-speed differential signals AC'_D1 and AC'_D2 through the first and second high-speed data lines 40_1 and 40_2 included in the high-speed signal channel 40. The embodiments of the disclosure are not limited to the above examples, and will be described while focusing on the storage device 3 for simplicity of description.

The GPU 4 may include a physical layer 410, a link layer 420, and a GPU device 430. The physical layer 410, the link layer 420, and the GPU device 430 of the GPU 4 may correspond to the physical layer 310, the link layer 320, and the memory device 330 of the storage device 3, respectively. The repetitive description may be omitted, and the differences will be mainly described.

The physical layer 410 of the GPU 4 may transmit and receive data between the host 2 and the GPU 4 to transmit and receive an analog electrical signal to and from the external interface. The high-speed differential signals AC_D1 and AC_D2 that are analog signals are provided from the host 2. Before the high-speed differential signals AC_D1 and AC_D2 are provided to the physical layer 410, the direct current signal DC is blocked by first and second DC block capacitors 41 and 42. The physical layer 410 of the GPU 4 may receive the first and second block high-speed differential signals AC'_D1 and AC'_D2 and provide a second digital data DD2 to the link layer 420. On the other hand, the physical layer 410 may receive the digital data from the link layer 420 and provide the high-speed differential signals that are analog signals to the host 2. For example, the physical layer 410 of the GPU 4 may include PCIe PHY, although not limited thereto.

The physical layer 410 of the GPU 4 operates in a second operation mode to receive the first and second DC block high-speed differential signals AC'_D1 and AC'_D2, newly define a common mode voltage for the first and second DC block high-speed differential signals AC'_D1 and AC'_D2, perform signal amplification, and output differential output signals.

The link layer 420 may output a second control signal Ctrl2 according to the communication protocol (rule) based on the second digital data DD2 outputted from the physical layer 410. The link layer 420 of the GPU 4 may include, e.g., PCIe Data Link, although not limited thereto.

The program for the GPU device 430 may be executed in response to the second control signal Ctrl2. The GPU device 430 of the GPU 4 may perform a calculation operation or the like using the second control signal Ctrl2. When the component that receives the first and second DC block high-speed differential signals AC'_D1 and AC'_D2 is not the GPU 4 but a modem chip or a CPU, a calculation operation or a required operation may be performed.

The low-speed signal channel 30 may include the first and second low-speed data lines 30_1 and 30_2 and transmit the first and second low-speed differential signals DC_D1 and DC_D2 of the interface between the host 2 and the storage device 3. The interface may be M-PHY, and the embodiments of the disclosure are not limited to the above example.

The high-speed signal channel 40 may include the first and second high-speed data lines 40_1 and 40_2 and transmit the first and second high-speed differential signals AC_D1 and AC_D2 between the host 2 and the GPU 4. The interface may include PCI express (PCIe), serial ATA (SATA), and a universal serial bus (USB), but the embodiments of the disclosure are not limited to the above examples.

Figure 5:
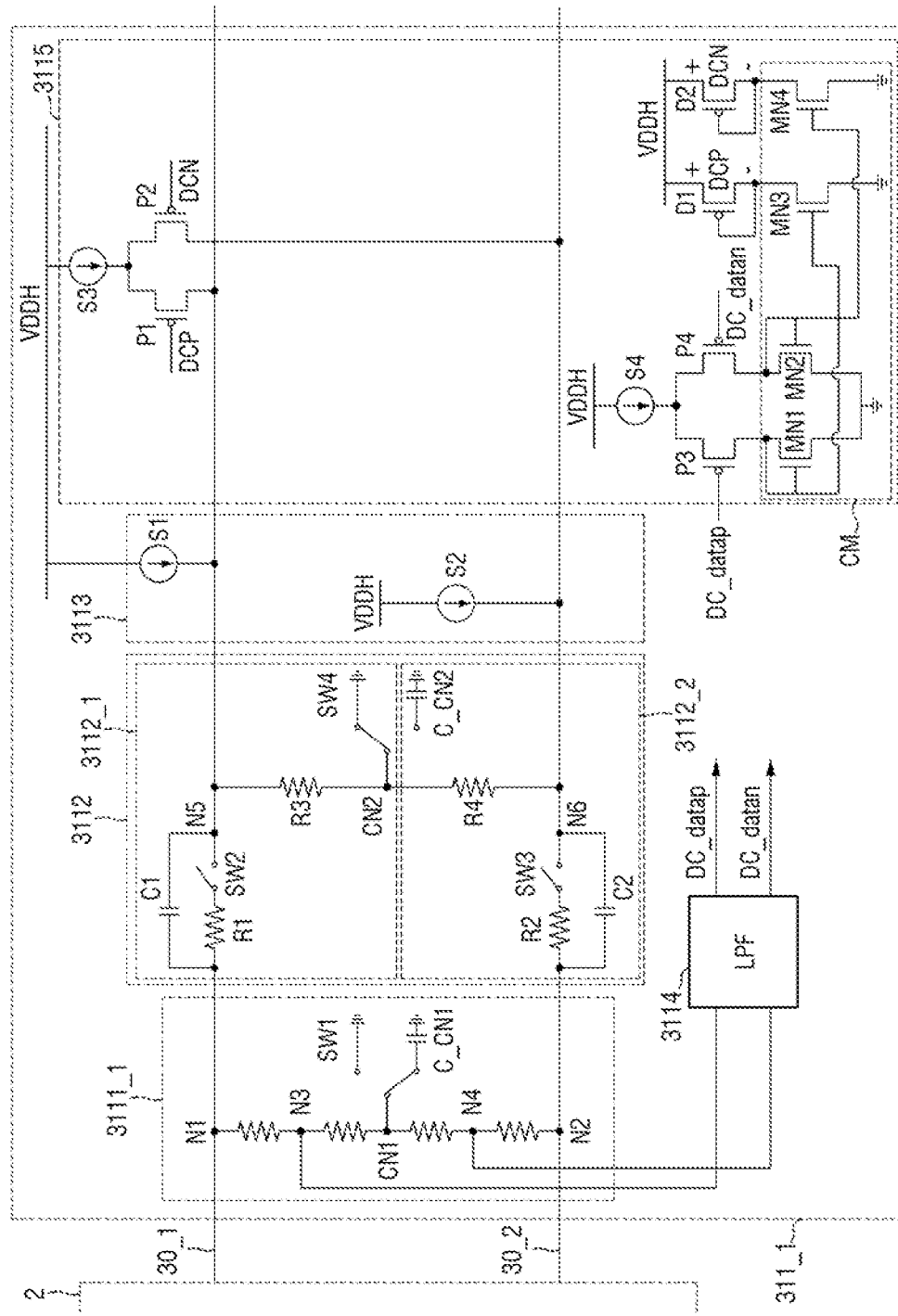
FIG. 5 is a circuit diagram illustrating an analog front-end receiver according to some embodiments of the disclosure.
Figure 6:
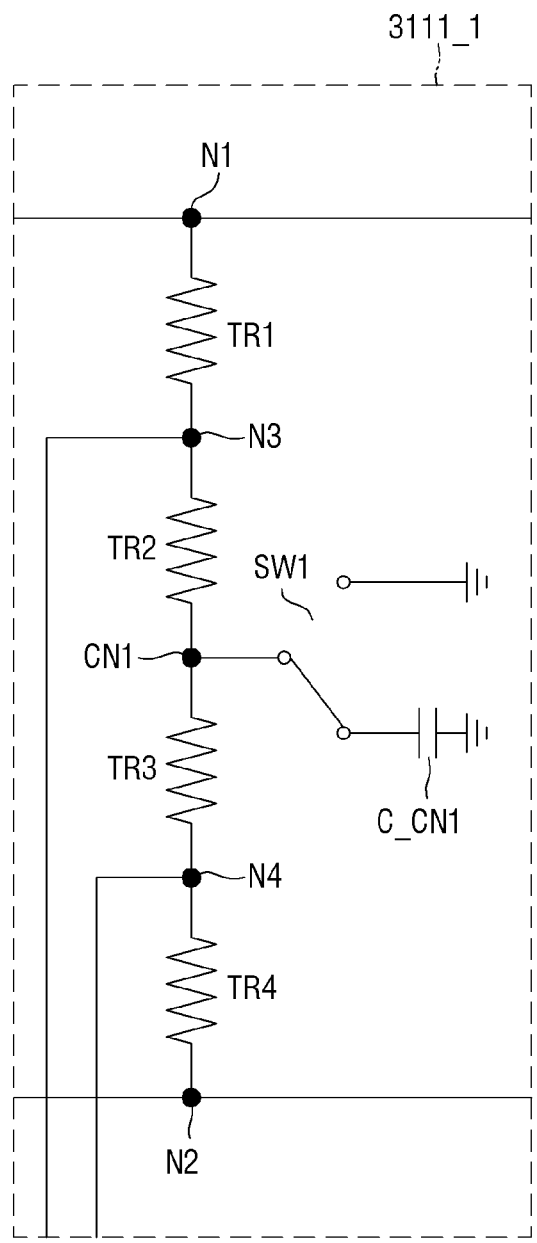
FIG. 6 shows a part of a circuit diagram illustrating a terminating resistor of FIG. 5.

FIG. 5 is a circuit diagram illustrating an analog front-end receiver 311_1 according to some embodiments of the disclosure. FIG. 6 shows a part of the circuit diagram illustrating a terminating resistor of FIG. 5.

Referring to FIGS. 5 and 6, the analog front-end receiver 311_1 includes a terminating resistor 3111_1, an equalizer 3112, a common mode voltage generator 3113, a low pass filter 3114, and a low-speed signal data converter 3115.

The terminating resistor 3111_1 is connected between a first node N1 connected to the first low-speed data line 30_1 and a second node N2 connected to the second low-speed data line 30_2.

The terminating resistor 3111_1 includes first to fourth terminating resistors TR1 to TR4. A first central node CN1 is disposed between the first and second terminating resistors TR1 and TR2 and the third and fourth terminating resistors TR3 and TR4. The sum of the resistance values of the first and second terminating resistors TR1 and TR2 is the same as the sum of the resistance values of the third and fourth terminating resistors TR3 and TR4.

The first central node CN1 is connected to a first switch SW1. The first switch SW1 may ground the first central node CN1 or may connect the first central node CN1 to a first central capacitor C_CN1 depending on the operation mode of the analog front-end receiver 311_1.

A third node N3 is disposed between the first terminating resistor TR1 and the second terminating resistor TR2. A fourth node N4 is disposed between the third terminating resistor TR3 and the fourth terminating resistor TR4. The ratio (TR1/TR2) of the resistance values of the first terminating resistor TR1 and the second terminating resistor TR2 is equal to the ratio (TR4/TR3) of the resistance values of the third terminating resistor TR3 and the fourth terminating resistor TR4. However, the above ratio is an example, and the embodiments are not limited thereto. The configuration of the terminating resistor 3111_1 may be changed depending on the operation mode of the analog front-end receiver 311_1.

The third node N3 and the fourth node N4 may be connected to the low pass filter 3114.

The equalizer 3112 may include a first equalizer 3112_1 and a second equalizer 3112_2. The first equalizer 3112_1 may be connected to the first node N1, and the second equalizer 3112_2 may be connected to the second node N2.

The first equalizer 3112_1 may include a first resistor R1 and a first capacitor C1 disposed between the first node N1 and a fifth node N5, and a third resistor R3 disposed between the fifth node N5 and a second central node CN2.

The first resistor R1 and the first capacitor C1 may be connected in parallel between the first node N1 and the fifth node N5. The first resistor R1 is connected to a second switch SW2. The second switch SW2 may be turned ON/OFF depending on the operation mode of the analog front-end receiver 311_1 to block or equalize the differential signal inputted to the first node N1.

The second equalizer 3112_2 may include a second resistor R2 and a second capacitor C2 disposed between the second node N2 and a sixth node N6, and a fourth resistor R4 disposed between the sixth node N6 and the second central node CN2.

The second resistor R2 and the second capacitor C2 may be connected in parallel between the second node N2 and the sixth node N6. The second resistor R2 is connected to a third switch SW3. The third switch SW3 may be turned ON/OFF depending on the operation mode of the analog front-end receiver 311_1 to block or equalize the differential signal inputted to the second node N2.

The second central node CN2 is connected to a fourth switch SW4. The fourth switch SW4 may ground the second central node CN2 or may connect the second central node CN2 to a second central capacitor C_CN2 depending on the operation mode of the analog front-end receiver 311_1. Depending on the operation mode of the analog front-end receiver 311_1, the second central capacitor C_CN2 may operate as one component of the equalizer.

The equalizer 3112 may control the second and third switches SW2 and SW3 depending on the operation mode of the analog front-end receiver 311_1 to perform channel distortion compensation and/or noise reduction on the differential signals inputted through the first node N1 and the second node N2 or to block the differential signals inputted through the first node N1 and the second node N2.

The equalizer 3112 may operate together with the common mode voltage generator 3113 to provide the common mode voltage to the fifth node N5 and the sixth node N6.

The common mode voltage generator 3113 may include a first current source S1 connected to the fifth node N5 and a second current source S2 connected to the sixth node N6. The first current source S1 and the second current source S2 may provide currents to the first equalizer 3112_1 and the second equalizer 3112_2 so that the common mode voltage may be provided to the fifth node N5 and the sixth node N6, respectively.

The low pass filter 3114 is connected to the third node N3 and the fourth node N4 and may receive the differential signals, filter the differential signals to reduce noise of the high-speed signals, and provide first and second low-speed differential signals DC_datap and DC_datan to the low-speed signal data converter 3115.

The low-speed signal data converter 3115 is connected to the low pass filter 3114 and receives the first and second low-speed filter signals DC_datap and DC_datan and provides low-speed voltages to the fifth node N5 and the sixth node N6 based on the first and second low-speed filter signals DC_datap and DC_datan.

The low-speed signal data converter 3115 may include a third current source S3, a fourth current source S4, a first transistor P1, a second transistor P2, a third transistor P3, a fourth transistor P4, a first diode D1, a second diode D2, and a current mirror CM.

The third transistor P3 may be connected to the fourth current source S4. The fourth transistor P4 may be connected to the fourth current source S4. The third transistor P3 and the fourth transistor P4 may be connected to the current mirror CM.

The first diode D1 and the second diode D2 are connected to the current mirror CM. A first low-speed control voltage DCP is applied to the first diode D1 and a second low-speed control voltage DCN is applied to the second diode D2 by the current flowing through the current mirror CM.

The current mirror CM may include a first mirror transistor MN1, a second mirror transistor MN2, a third mirror transistor MN3, and a fourth mirror transistor MN4. The first mirror transistor MN1 is connected to the source of the third transistor P3, and the second mirror transistor MN2 is connected to the source of the fourth transistor P4.

The first mirror transistor MN1 and the third mirror transistor MN3 may form one current mirror. The third mirror transistor MN3 may provide a current to the first diode D1 based on the current flowing through the first mirror transistor MN1. The second mirror transistor MN2 and the fourth mirror transistor MN4 may form one current mirror. The fourth mirror transistor MN4 may provide a current to the second diode D2 based on the current flowing through the second mirror transistor MN2.

The third current source S3 may be connected to the fifth node N5 through the first transistor P1 and may be connected to the sixth node N6 through the second transistor P2. The low-speed voltage may be provided to the fifth node N5 based on the first low-speed control voltage DCP inputted to the gate of the first transistor P1, and the low-speed voltage may be provided to the sixth node N6 based on the second low-speed control voltage DCN inputted to the gate of the second transistor P2.

In FIG. 5, in the low-speed signal data converters 3115, the first to fourth transistors P1 to P4 are P-type transistors and the first to fourth mirror transistors MN1 to MN4 are N-type transistors. However, this is merely an example, and the embodiments of the disclosure are not limited to the above transistor types.

Figure 7:
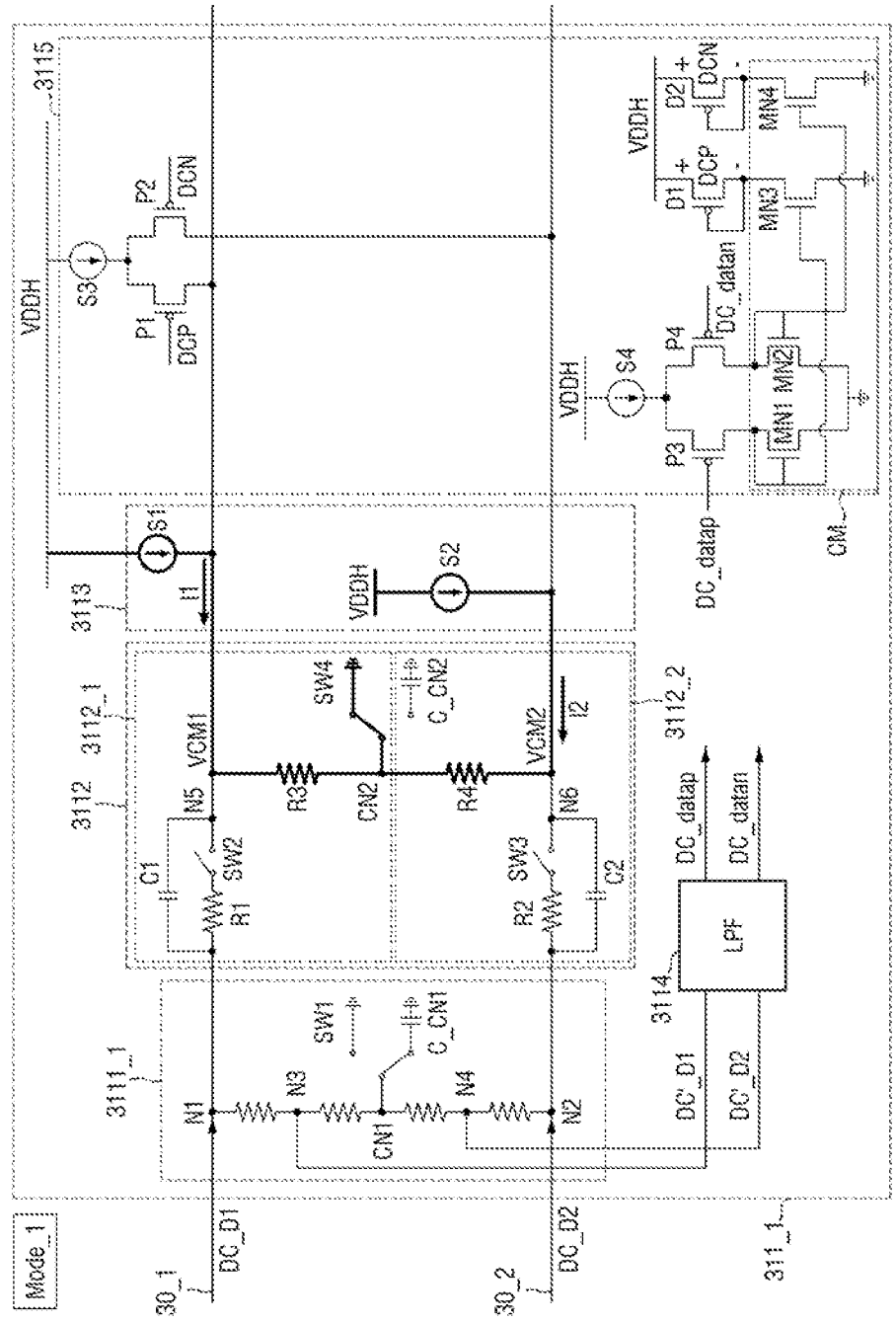
FIGS. 7 to 9 are diagrams explaining an operation of an analog front-end receiver according to some embodiments of the disclosure.
Figure 8:
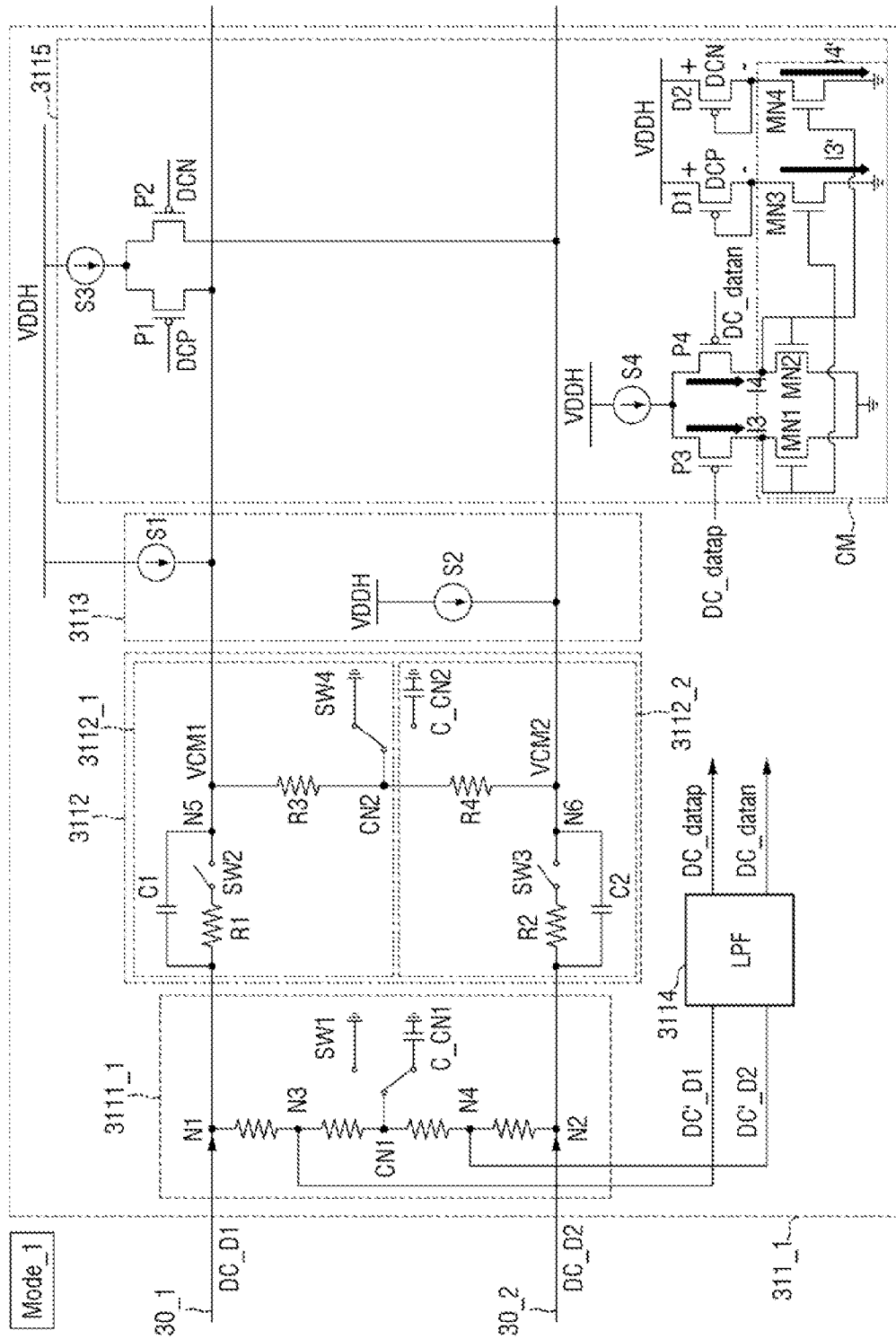
Figure 9:
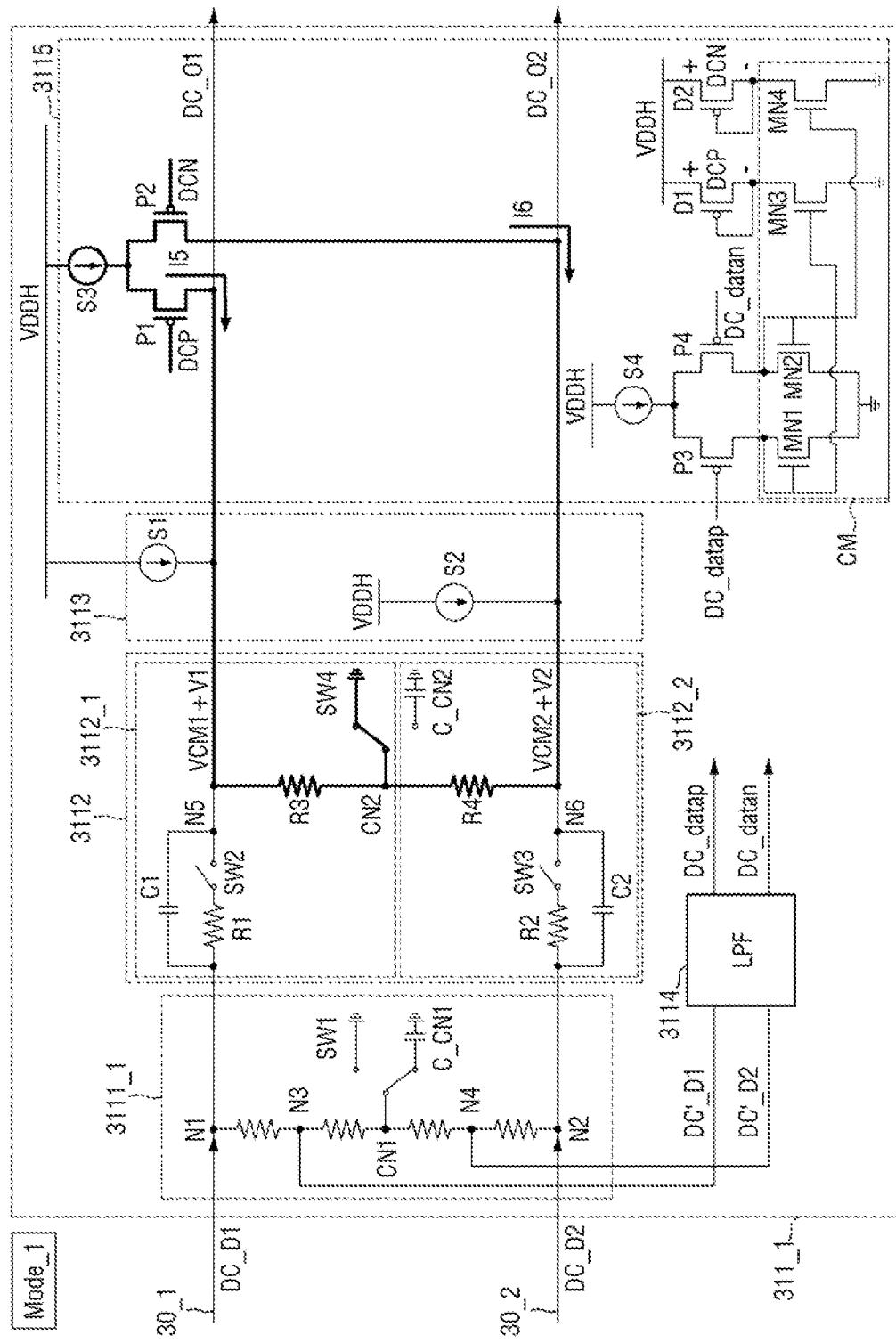

FIGS. 7 to 9 are diagrams explaining an operation of an analog front-end receiver according to some embodiments of the disclosure.

Referring to FIG. 7, the analog front-end receiver 311_1 of the storage device 3 may operate in a first operation (mode_1). In the first operation mode (mode_1), the first low-speed differential signal DC_D1 may be inputted to the analog front-end receiver 311_1 through the first node N1, and the second low-speed differential signal DC_D2 may be inputted to the analog front-end receiver 311_1 through the second node N2.

In the first operation mode (mode_1), the first switch SW1 connects the first central node CN1 with the first central capacitor C_CN1, the second switch SW2 is turned off to block the first low-speed differential signal DC_D1, the third switch SW3 is turned off to block the second low-speed differential signal DC_D2, and the fourth switch SW4 grounds the second central node CN2.

In the first operation mode (mode_1), the first current source S1 and the third resistor R3 form one closed circuit, the first current source S1 provides a first current I1 to the third resistor R3 so that a first common mode voltage VCM1 is provided to the fifth node N5, the second current source S2 and the fourth resistor R4 form one closed circuit, and the second current source S2 provides a second current I2 to the fourth resistor R4 so that a second common mode voltage VCM2 is provided to the sixth node N6.

In the first operation mode (mode_1), the terminating resistor 3111_1 converts the first low-speed differential signal DC_D1 into a third low-speed differential signal DC'_D1 using voltage distribution based on the ratio of the resistance values of the first terminating resistor TR1 and the second terminating resistor TR2 and provides the third low-speed differential signal DC'_D1 to the low pass filter 3114. The terminating resistor 3111_1 converts the second low-speed differential signal DC_D2 into a fourth low-speed differential signal DC'_D2 using voltage distribution based on the ratio of the resistance values of the third terminating resistor TR3 and the fourth terminating resistor TR4 and provides the fourth low-speed differential signal DC'_D2 to the low pass filter 3114.

Referring to FIG. 8, the low pass filter 3114 receives the third low-speed differential signal DC'_D1 and outputs the first low-speed filter differential signal DC_datap. Further, the low pass filter 3114 receives the fourth low-speed differential signal DC'_D2 and outputs the second low pass filter differential signal DC_datan.

The first low-speed filter differential signal DC_datap is inputted to the gate of the third transistor P3. The fourth current source S4 provides a third current I3 to the current mirror CM through the third transistor P3 based on the first low-speed filter differential signal DC_datap. The third current I3' converted by the current mirror CM is provided to the first diode D1, and the first low-speed control voltage DCP is applied to the first diode D1.

The second low-speed filter differential signal DC_datan is inputted to the gate of the fourth transistor P4. The fourth current source S4 provides a fourth current I4 to the current mirror CM through the fourth transistor P4 based on the second low-speed filter differential signal DC_datan. The fourth current I4' converted by the current mirror CM is provided to the second diode D2, and the second low-speed control voltage DCN is applied to the second diode D2.

Referring to FIG. 9, the first low-speed control voltage DCP is applied to the gate of the first transistor P1, the second low-speed control voltage DCN is applied to the gate of the second transistor P2, and the three current source S3 provides a fifth current I5 to the fifth node N5 based on the first low-speed control voltage DCP and provides a sixth current I6 to the sixth node N6 based on the second low-speed control voltage DCN.

The third current source S3 and the third resistor R3 form one closed circuit, and the third current source S3 provides the fifth current I5 to the third resistor R3 so that a first low-speed voltage V1 is provided to the fifth node N5. The third current source S3 and the fourth resistor R4 form one closed circuit, and the third current source S3 provides the sixth current I6 to the fourth resistor R4 so that a second low-speed voltage V2 is provided to the sixth node N6.

In the first operation mode (mode_1), the analog front-end receiver 311_1 outputs a first low-speed differential output signal DC_O1 obtained by combining the first common mode voltage VCM1 and the first low-speed voltage V1 at the fifth node N5, and outputs a second low-speed differential output signal DC_O2 obtained by combining the second common mode voltage VCM2 and the second low-speed voltage V2 at the sixth node N6.

Figure 10:
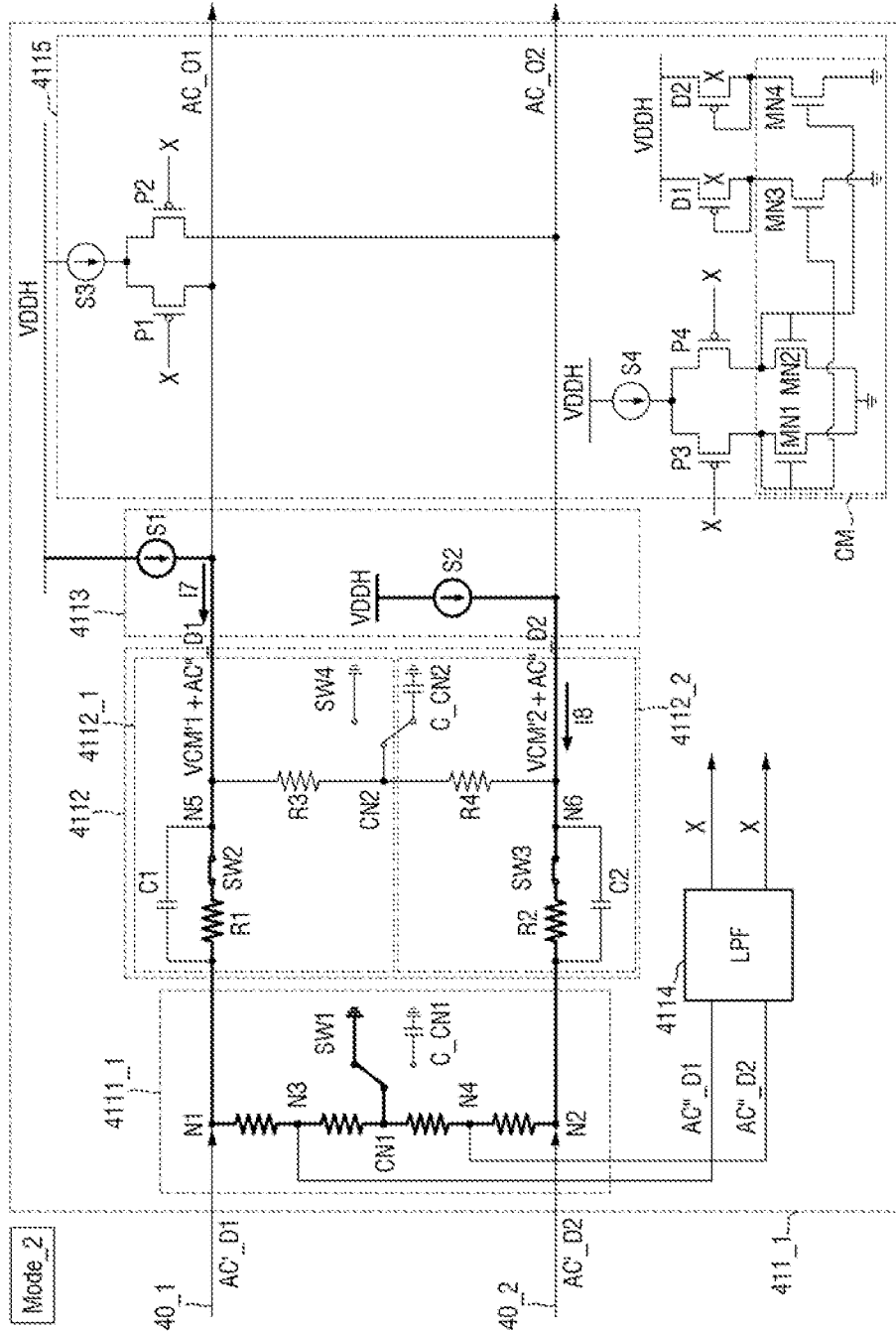
FIG. 10 is a diagram illustrating an operation of an analog front-end receiver according to some embodiments of the disclosure.

FIG. 10 is a diagram illustrating another operation of the analog front-end receiver 411_1 according to some embodiments of the disclosure.

Referring to FIG. 10, an analog front-end receiver 411_1 of the GPU 4 may operate in a second operation mode (mode_2). In the second operation mode (mode_2), the first DC block high-speed differential signal AC'_D1 is inputted to the analog front-end receiver 411_1 through the first node N1, and the second DC block high-speed differential signal AC'_D2 is inputted to the analog front-end receiver 411_1 through the second node N2.

In the second operation mode (mode_2), the first switch SW1 grounds the first central node CN1, the second switch SW2 is turned on to provide a first high-speed equalization differential signal AC"_D1 obtained by compensating and equalizing channel distortion of the first DC block high-speed differential signal AC'_D1 to the fifth node N5, the third switch SW3 is turned on to provide a second high-speed equalization differential signal AC"_D2 obtained by compensating channel distortion of the second DC block high-speed differential signal AC'_D2 to the fifth node N5, and the fourth switch SW4 connects the second central node CN2 with the second central capacitor C_CN2.

In the second operation mode (mode_2), the first current source S1, the first resistor R1, and the first and second terminating resistors TR1 and TR2 form one closed circuit, and the first current source S1 provides a seventh the current I7 to the first resistor R1 and the first and second terminating resistors TR1 and TR2 so that a first common mode voltage VCM'1 is provided to the fifth node N5. The second current source S2, the second resistor R2, and the third and fourth terminating resistors TR3 and TR4 form one closed circuit, and the second current source S2 provides an eighth current I8 to the second resistor R2 and the third and fourth terminating resistors TR3 and TR4 so that a second common mode voltage VCM'2 is provided to the sixth node N6.

In the second operation mode (mode_2), a terminating resistor 4111_1 provides third and fourth low-speed differential signals AC'"_D1 and AC'"_D2. Since, however, the low pass filter 4114 is turned off, no signal is outputted and, thus, the low-speed signal data converter 4115 does not operate.

In the second operation mode (mode_2), the analog front-end receiver 411_1 outputs the first high-speed differential output signal AC_O1 obtained by combining the first common mode voltage VCM'1 and the first high-speed equalization differential signal AC"_D1 at the fifth node N5, and outputs the second high-speed differential output signal AC_O2 obtained by combining the second common mode voltage VCM'2 and the second high-speed equalization differential signal AC"_D2 at the sixth node N6.

Figure 11:
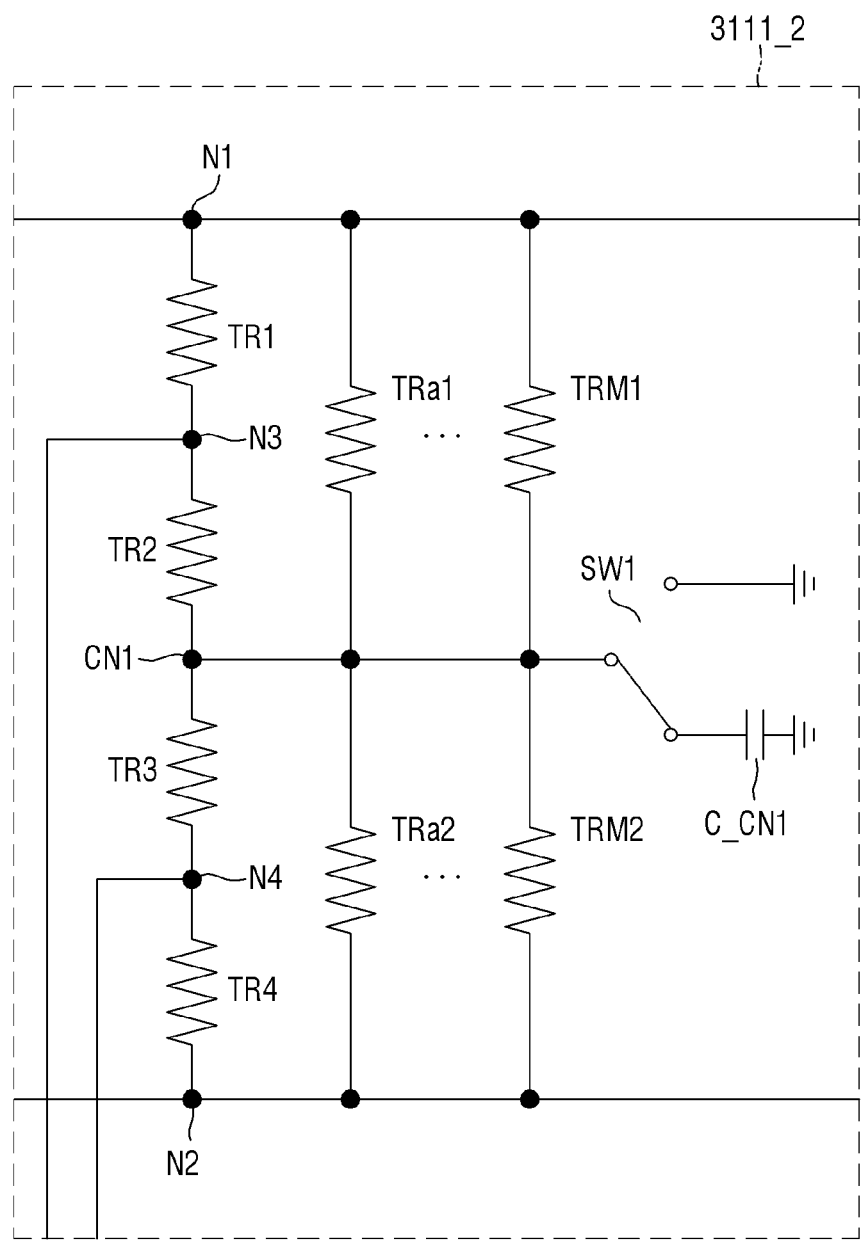
FIG. 11 is a diagram illustrating an analog front-end receiver according to some embodiments of the disclosure.

FIG. 11 is a diagram illustrating an analog front-end receiver according to some other embodiments of the disclosure.

In the following, a terminating resistor 3111_2 of the analog front-end receiver according to some other embodiments of the disclosure will be described with reference to FIG. 11. The differences between the terminating resistor 3111_2 and the terminating resistor 3111_1 of the analog front-end receiver 311_1 shown in FIGS. 5 and 6 will be mainly described.

Compared to the terminating resistor 3111_1 of FIG. 6, the terminating resistor 3111_2 further includes a plurality of first parallel resistors TRa1 to TRM1 and a plurality of second parallel resistors TRa2 to TRM2.

One ends of the plurality of first parallel resistors TRa1 to TRM1 may be connected to the first node N1 and the other ends of the plurality of first parallel resistors TRa1 to TRM1 may be connected to the first central node CN1. One ends of the plurality of second parallel resistors TRa2 to TRM2 may be connected to the second node N2 and the other ends of the plurality of second parallel resistors TRa2 to TRM2 may be connected to the first central node CN1.

The plurality of first parallel resistors TRa1 to TRM1 and the first and second terminating resistors TR1 and TR2 are arranged in parallel between the first node N1 and the first central node CN1. The plurality of second parallel resistors TRa2 to TRM2 and the third and fourth terminating resistors TR3 and TR4 are arranged in parallel between the second node N2 and the first central node CN1.

Figure 12:
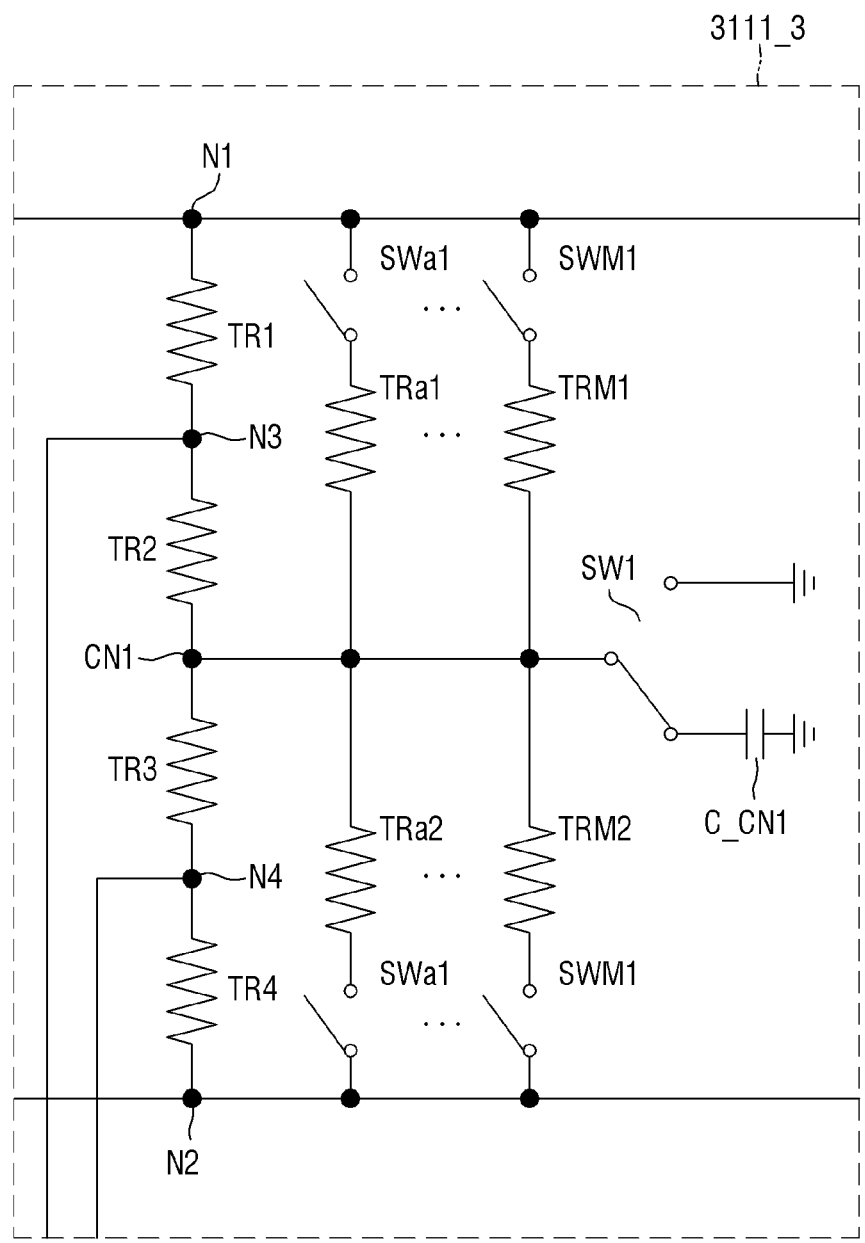
FIG. 12 is a diagram illustrating an analog front-end receiver according to some embodiments of the disclosure.

FIG. 12 is a diagram illustrating an analog front-end receiver according to some other embodiments of the disclosure.

In the following, a terminating resistor 3111_3 of the analog front-end receiver according to some other embodiments of the disclosure will be described with reference to FIG. 12. The differences between the terminating resistor 3111_3 and the terminating resistor 3111_2 shown in FIG. 11 will be mainly described.

Compared to the terminating resistor 3111_2 of FIG. 11, the terminating resistor 3111_3 further includes a plurality of first parallel switches SWa1 to SWM1 and a plurality of second parallel switches SWa2 to SWM2.

The plurality of first parallel switches SWa1 to SWM1 and the plurality of first parallel resistors TRa1 to TRM1 are arranged in series, respectively, between the first node N1 and the first central node CN1. The plurality of second parallel switches SWa2 to SWM2 and the plurality of second parallel resistors TRa2 to TRM2 are arranged in series, respectively, between the second node N2 and the first central node CN1.

The plurality of first parallel switches SWa1 to SWM1 may be individually turned ON/OFF to control the flow of the current through the plurality of first parallel resistors TRa1 to TRM1, respectively. The plurality of second parallel switches SWa2 to SWM2 may be individually turned ON/OFF to control the flow of the current through the plurality of second parallel resistors TRa2 to TRM2, respectively.

Figure 13:
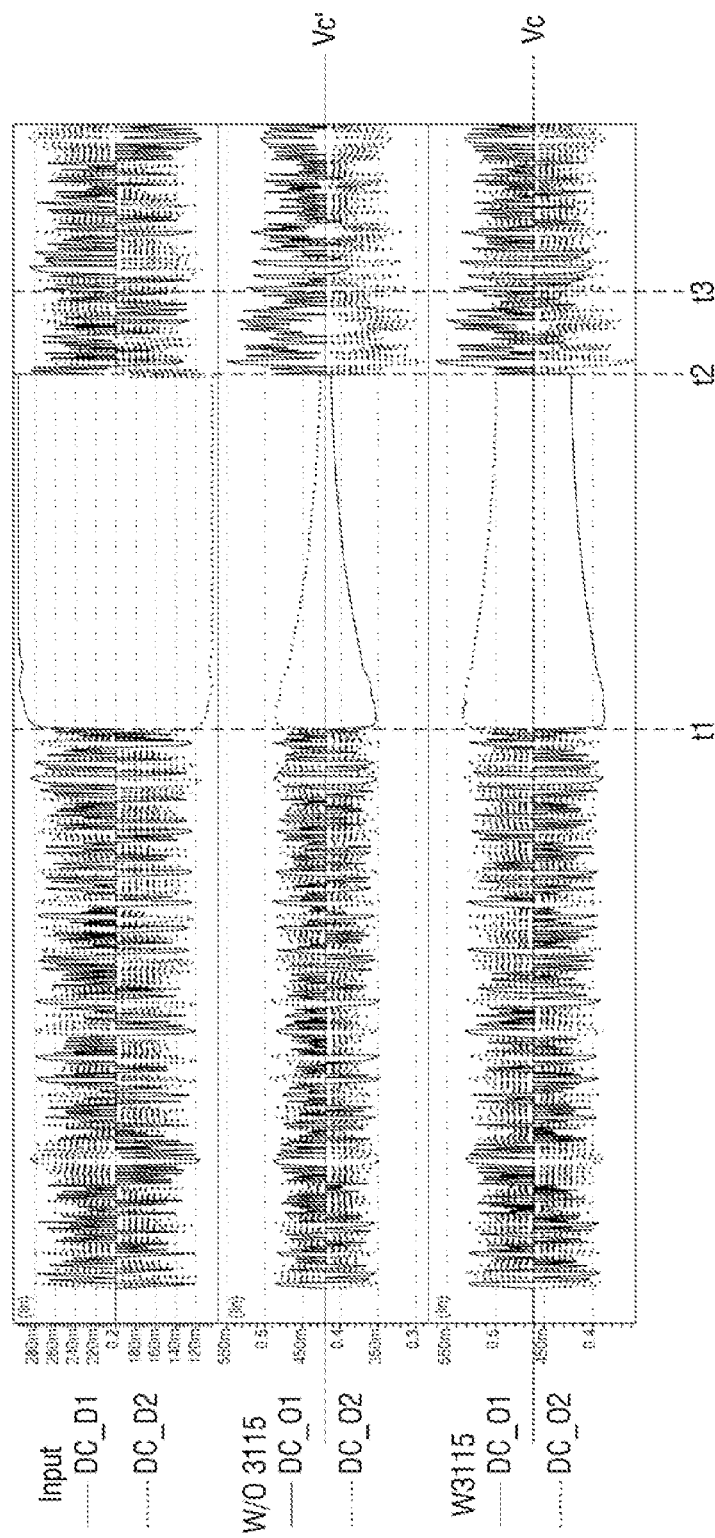
FIG. 13 is a signal graph illustrating an effect of an analog front-end receiver according to some embodiments of the disclosure.

FIG. 13 is a signal graph illustrating the effect of the analog front-end receiver according to some embodiments of the disclosure.

Referring to FIG. 13, the analog front-end receiver 311_1 of the disclosure including the low-speed signal data converter 3115 outputs a common mode voltage Vc close to 460 mV, and a typical analog front-end receiver that does not include the low-speed signal data converter 3115 outputs a common mode voltage Vc' close to 430 mV that is lower than that of the analog front-end receiver 311_1.

The analog front-end receiver 311_1 according to some embodiments of the disclosure includes the analog front-end receiver 3113 that newly defines the common mode voltage. When a subsequent component that receives the output of the analog front-end receiver 311_1 requires a relatively high common mode voltage, the common mode voltage generator 3113 may newly define the common mode voltage to provide the required common mode voltage.

Referring to FIG. 13 as well as FIG. 9, the analog front-end receiver 311_1 according to some embodiments of the disclosure may provide a higher voltage at a first time t1 by adding the low-speed voltages V1 and V2 to the common mode voltages VCM1 and VCM2, respectively, by using the low-speed signal data converter 3115. Therefore, the analog front-end receiver 311_1 according to some embodiments of the disclosure may maintain the first low-speed differential output signal DC_O1 up to a second time t2 compared to the typical analog front-end receiver that does not include the low-speed signal data converter 3115.

In addition, in the analog front-end receiver 311_1 according to some embodiments of the disclosure, at the second time t2, the frequencies of the first and second low-speed differential signals DC_D1 and DC_D2 increase, the central axis of the first low-speed differential output signal DC_O1 rises, and the central axis of the second low-speed differential output signal DC_O2 falls. Then, at a third time t3, the central axes of the outputs of the first and second low-speed differential output signals DC_O1 and DC_O2 of the analog front-end receiver 311_1 return to the common mode voltage Vc. The central axes of the first and second low-speed differential output signals DC_O1 and DC_O2 of the analog front-end receiver 311_1 may quickly return to the common mode voltage Vc compared to the typical analog front-end receiver that does not include the low-speed signal data converter 3115 due to the first and second capacitors C1 and C2 (see FIG. 5) that are charged from the first time t1 to the second time t2.

The analog front-end receiver 311_1 according to some embodiments of the disclosure may receive both the high-speed differential signal and the low-speed differential signal. The path through which the high-speed differential signal passes and the path through which the low-speed differential signal passes are separated, and the two paths share a terminating resistor. For example, when the low pass filter through which the low-speed differential signal passes is turned ON/OFF depending on the operation mode of the analog front-end receiver based on the above characteristics, there is no variation in the resistance of the analog front-end receiver when viewed from the outside.

However, the effects of the embodiments are not restricted to the one set forth herein. The above and other effects of the example embodiments will become more apparent to one of daily skill in the art to which the disclosure pertains by referencing the claims. While the disclosure has been particularly shown and described with reference to embodiments thereof, it will be understood that various changes in form and details may be made therein without departing from the spirit and scope of the following claims.

What is claimed is:

1. An analog front-end receiver comprising:
   a first equalizer including a first block switch, the first block switch being configured to receive a first differential signal through a first node to which a first data line is electrically connected, and configured to block the first differential signal in a first operation mode;
   a second equalizer including a second block switch, the second block switch being configured to receive a second differential signal through a second node to which a second data line is electrically connected, and configured to block the second differential signal in the first operation mode, the second differential signal being in a differential relationship with the first differential signal, and the second data line being different from the first data line;
   a terminating resistor provided between the first node and the second node, the terminating resistor being configured to receive the first differential signal from the first data line via the first node, and configured to receive the second differential signal from the second data line via the second node; and
   a low pass filter configured to receive a third differential signal converted by the terminating resistor from the first differential signal, and configured to receive a fourth differential signal converted by the terminating resistor from the second differential signal.

2. The analog front-end receiver of claim 1, wherein a resistance value of the terminating resistor is equally divided at a central node,
   a first terminating resistor and a second terminating resistor included in the terminating resistor are provided between the central node and the first node,
   a third terminating resistor and a fourth terminating resistor included in the terminating resistor are provided between the central node and the second node,
   the third differential signal is outputted through a third node provided between the first terminating resistor and the second terminating resistor, and
   the fourth differential signal is outputted through a fourth node provided between the third terminating resistor and the fourth terminating resistor.

3. The analog front-end receiver of claim 2, wherein the first terminating resistor is provided between the first node and the third node,
   the second terminating resistor is provided between the third node and the central node,
   the third terminating resistor is provided between the central node and the fourth node,
   the fourth terminating resistor is provided between the fourth node and the second node, and
   a ratio of resistance values of the first terminating resistor and the second terminating resistor is equal to a ratio of resistance values of the fourth terminating resistor and the third terminating resistor.

4. The analog front-end receiver of claim 2, wherein the terminating resistor further includes:
   a plurality of first parallel resistors, each of which has a first terminal electrically connected to the first node and a second terminal electrically connected to the central node, the plurality of first parallel resistors being arranged in parallel with the first terminating resistor and the second terminating resistor; and
   a plurality of second parallel resistors, each of which has a first terminal electrically connected to the central node and a second terminal electrically connected to the second node, the plurality of second parallel resistors being arranged in parallel with the third terminating resistor and the fourth terminating resistor.

5. The analog front-end receiver of claim 4, wherein the terminating resistor further includes:
   a plurality of first switches respectively electrically connected to the plurality of first parallel resistors and configured to respectively control operations of the plurality of first parallel resistors; and
   a plurality of second switches respectively electrically connected to the plurality of second parallel resistors and configured to respectively control operations of the plurality of second parallel resistors.

6. The analog front-end receiver of claim 2, further comprising a central switch provided at the central node,
   wherein the central switch is configured to electrically connect the central node to a central capacitor in the first operation mode, and
   the central switch is further configured to ground the central node in a second operation mode different from the first operation mode.

7. The analog front-end receiver of claim 1, wherein in a second operation mode different from the first operation mode,
   the first equalizer is further configured to control the first block switch to output, to a fifth node, a first equalization differential signal corresponding to the first differential signal,
   the second equalizer is further configured to control the second block switch to output, to a sixth node, a second equalization differential signal corresponding to the second differential signal, and
   the low pass filter is turned off to block the third differential signal and the fourth differential signal.

8. The analog front-end receiver of claim 7, further comprising a common mode voltage generator, the common mode voltage generator including a first current source electrically connected to the fifth node and a second current source electrically connected to the sixth node,
   wherein the first current source is configured to provide a current to the first equalizer to provide a first common mode voltage to the fifth node, and the second current source is configured to provide a current to the second equalizer to provide a second common mode voltage to the sixth node.

9. The analog front-end receiver of claim 8, wherein in the second operation mode,
   a first differential output signal is formed at the fifth node by using the first common mode voltage and the first equalization differential signal, and
   a second differential output signal is formed at the sixth node by using the second common mode voltage and the second equalization differential signal.

10. The analog front-end receiver of claim 8, wherein in the first operation mode,
   the low pass filter is further configured to receive the third differential signal and output a first filter differential signal,
   the low pass filter is further configured to receive the fourth differential signal and output a second filter differential signal,
   a third differential output signal is formed at the fifth node by using the first common mode voltage and the first filter differential signal, and
   a fourth differential output signal is formed at the sixth node by using the second common mode voltage and the second filter differential signal.

11. The analog front-end receiver of claim 1, wherein in the first operation mode, the first differential signal and the second differential signal include a low-speed signal (DC) having a low-speed frequency, and
   in a second operation mode different from the first operation mode, the first differential signal and the second differential signal do not include the low-speed signal.

12. An analog front-end receiver comprising:
   a terminating resistor provided between a first node, to which a first data line is electrically connected, and a second node, to which a second data line is electrically connected, the terminating resistor being configured to receive a first differential signal from the first data line via the first node, and configured to receive a second differential signal from the second data line via the second node, the second differential signal being differential from the first differential signal;
   a first equalizer configured to, in a first operation mode, block the first differential signal provided through the first node, and configured to, in a second operation mode, output a first equalization differential signal corresponding to the first differential signal to a third node without blocking the first differential signal, the second operation mode being different from the first operation mode;
   a second equalizer configured to, in the first operation mode, block the second differential signal provided through the second node, and configured to, in the second operation mode, output a second equalization differential signal corresponding to the second differential signal to a fourth node without blocking the second differential signal; and
   a common mode voltage generator including a first current source electrically connected to the third node and a second current source electrically connected to the fourth node,
   wherein the first current source is configured to provide a current to the first equalizer to provide a first common mode voltage to the third node, and the second current source is configured to provide a current to the second equalizer to provide a second common mode voltage to the fourth node.

13. The analog front-end receiver of claim 12, wherein in the first operation mode, the first differential signal and the second differential signal include a low-speed signal (DC) having a low-speed frequency, and
   in the second operation mode, the first differential signal and the second differential signal do not include the low-speed signal.

14. The analog front-end receiver of claim 12, further comprising a low pass filter configured to receive a third differential signal converted by the terminating resistor from the first differential signal, and configured to receive a fourth differential signal converted by the terminating resistor from the second differential signal.

15. The analog front-end receiver of claim 14, wherein in the second operation mode,
   a first differential output signal is formed at the third node by using the first common mode voltage and the first equalization differential signal, and
   a second differential output signal is formed at the fourth node by using the second common mode voltage and the second equalization differential signal.

16. An electronic device comprising:
   a physical layer configured to receive a first differential signal and a second differential signal that are differential from each other through an external interface, and configured to output digital data corresponding to the first differential signal and the second differential signal;
   a link layer configured to output a control signal based on the digital data; and
   a driving device in which a program is executed based on the control signal,
   wherein the physical layer includes:
      a first equalizer configured to, in a first operation mode, block the first differential signal provided through a first node, and configured to, in a second operation mode, output a first equalization differential signal corresponding to the first differential signal without blocking the first differential signal, the second operation mode being different from the first operation mode;
      a second equalizer configured to, in the first operation mode, block the second differential signal provided through a second node, and configured to, in the second operation mode, output a second equalization differential signal corresponding to the second differential signal without blocking the second differential signal;
      a terminating resistor provided between the first node and the second node, and configured to receive the first differential signal through the first node, and configured to receive the second differential signal through the second node; and
      a low pass filter configured to receive a third differential signal converted by the terminating resistor from the first differential signal, and to receive a fourth differential signal converted by the terminating resistor from the second differential signal,
   wherein in the second operation mode, the low pass filter is turned off to block outputs corresponding to the third differential signal and the fourth differential signal.

17. The electronic device of claim 16, wherein the driving device is a graphics processing unit (GPU) device, and
   the first differential signal and the second differential signal include a high-speed signal (AC) having a high-speed frequency.

18. The electronic device of claim 17, wherein the physical layer is configured to operate in the second operation mode.

19. The electronic device of claim 16, wherein the driving device is a memory device, and
   the first differential signal and the second differential signal include a low-speed signal (DC) having a low-speed frequency.

20. The electronic device of claim 19, wherein the physical layer is configured to operate in the first operation mode.

* * * * *